Patented Aug. 8, 1944

2,355,245

UNITED STATES PATENT OFFICE 2,355,245

POLYMERS OF ALKYL GLYCOSIDES AND PROCESS FOR PREPARING THE SAME

Richard Seyfarth Schreiber and James Herbert Werntz, Wilmington, Del., assignors to E. I. du Pont de Nemours & Company, Wilmington, Del., a corporation of Delaware No Drawing. Application July 24, 1942, Serial No. 452,134

10 Claims. (Cl. 260—210)

This invention relates to polymers of alkyl glycosides.

In the manufacture of regenerated cellulose film softeners are very frequently employed. These must be water soluble but not migratory, non-volatile, and compatible with the regenerated cellulose. Glycerol and ethylene glycol have been used for this purpose, but leave much to be desired.

This invention has as an object new polymeric, water soluble materials. A further object includes new polymeric materials of low volatility and high compatibility with regenerated cellulose. Another object comprises regenerated cellulose objects and particularly films containing as softeners therefor the new polymeric materials of this invention. Other objects will appear hereinafter.

These objects are accomplished by the following invention of a polymerization process wherein a monomeric alkyl glycoside is polymerized by heating, under substantially anhydrous conditions, with an acidic catalyst to yield a water soluble polyglycoside which polyglycoside may be used as a softener for regenerated cellulose film. By substantially anhydrous conditions is meant that the reaction mixture contains no more than traces of water, i. e., not more than 1%.

In carrying out the process of this invention an alkly glycoside is mixed with less than 1% by weight of an acidic catalyst such as sulfuric acid, iodine, or a trialkylsulfonium iodide and the mixture is then heated at 150–200° C. for several hours preferably under an inert atmosphere either at atmospheric or reduced pressures. During this heating period the alcohol corresponding to that used in the preparation of the monomeric glycoside is evolved with subsequent increase in the viscosity of the melt. The resulting synthetic polyglycosides are clear, transparent, glassy, brittle solids which are still optically active and soluble in water and alcohol, but insoluble in acetone.

The more detailed practice of the invention is illustrated by the following examples, wherein parts given are by weight. There are of course many forms of the invention other than these specific embodiments.

*Example I*

Ten parts of alpha-methylglucoside was melted under nitrogen at 180° C. at atmospheric pressure which resulted in a clear light amber fluid. To this solution were added a few crystals of dodecyldimethylsulfonium iodide. Immediately after the addition of this catalyst there was a steady evolution of bubbles indicating the formation of a distillate which was found to be methanol. The viscosity of the solution increased during the course of 30 minutes and at the end of this time a vacuum of 3 mm. was applied for an additional 20 minutes. The viscous, amber fluid was allowed to cool at room temperature resulting in a transparent, amber, brittle, glassy solid which was soluble in water, alcohol and acetic acid, but insoluble in acetone and dioxane and gradually melted over the range of 59–93° C. Molecular weight determinations run in acetic acid gave a value of 380 indicating the condensation of about 3 units of methyl glucoside.

*Example II*

Twenty parts of alpha-methylglycoside was treated with 0.01 part of diethylmethylsulfonium iodide catalyst and the mixture heated to 180° C. during which time the alpha-methylglucoside liquefied. At this temperature the melt appeared to darken somewhat and at the same time became increasingly more viscous. At the end of 15 minutes heating was discontinued and the transparent, brown, glassy solid which resulted was found to have a softening point of 150° C. and a molecular weight of 455 as determined by freezing point depression in water. This product was found to be optically active having a specific rotation of $$[\alpha]_D^{23°} = 98°$$

and to be readily soluble in acetone.

*Example III*

Ten parts of alpha-methylglucoside was heated at 218° C. for 15 minutes in order to liquefy the glucoside. At this point 0.01 part of dodecyldimethylsulfonium iodide catalyst was added and the heating continued for an additional 45 minutes. The evolution of methanol was quite vigorous and the viscosity increased rapidly during this heating period. The resulting amber colored, transparent, brittle solid, which had a softening point of 208° C. and melted at 245° C., was soluble in methanol and water, but insoluble in acetone. Molecular weight determinations by cryoscopic methods gave a value of 729, indicating that this material was composed of 4–5 methylglucoside units.

*Example IV*

Fifty parts of alpha-methylglucoside was treated with 0.0054 part of sulfuric acid dissolved in 0.2 part of methanol. This mixture was heated at 180° C. for 1½ hours during which time 8.3 parts of liquid was evolved. This liquid was analyzed and found to be practically pure methanol. The light amber solid which resulted had a melting point of 210° C. and was soluble in methanol and water, but insoluble in acetone. The methoxyl content was found to be 3.6% indicating a molecular weight of 861 or slightly more than five glucoside units.

*Example V*

Alpha-methylglucoside and a trace of dodecyldimethylsulfonium iodide were heated at 170° C. Methanol was evolved. On cooling the product was a hard, brittle resin. Similar results were obtained when N-hexadecylpyridinium bromide was employed in place of the sulfonium iodide as a catalyst.

*Example VI*

Two hundred parts of alpha-methylglucoside and about 8 parts of a methanol solution containing about 0.000912 part of boron trifluoride were heated one hour at 170°–180° C. The product was a hard, clear, glass-like resin.

*Example VII*

Fifty parts of alpha-methylglucoside was heated with 0.0054 part of sulfuric acid dissolved in 0.2 part of methanol at 180° C. for 2½ hours, during which time methanol was evolved. The resulting viscous, amber liquid was allowed to cool, giving a glassy, brittle polymer having a melting point above 200° C. which was soluble in methanol and water but insoluble in acetone. The methoxyl content was found to be 1.71% which indicates a molecular weight of 1812 or approximately 11 glucosidic units.

While any monomeric alkyl glycoside may be employed in the process of this invention to prepare water soluble polymeric glycosides, it is preferred that the glycosides be those of alcohols of low molecular weight, e. g., methylglycosides, ethylene glycol, glycerol, sorbitol, 1-dodecylthiosides, amylglycosides and hexylglycosides, i. e., any glycoside of an alkanol of from one to six carbon atoms including not only alkyl glyoscides of glucose, but also those of monosaccharides in general including those of arabinose, ribose, xylose, galactose, fructose, threose, rhamnose, glycerose, and mannose. Mono, di, and tri substituted ethers or esters of alkyl glycoside are also applicable, for example, triacetyl methylglucoside, ethyl methylglucoside, and acetyl methylglucoside.

In the process of this invention, any acidic catalyst may be employed. However, those acidic catalysts are preferred which are strong acids, or render available a strong acid under the conditions of the reaction, such as sulfuric acid, dimethyl sulfate, iodine, trialkylsulfonium iodides, such as dodecyldimethylsulfonium iodide and ethyldimethylsulfonium iodide, ammonium chloride, piperidine hydrochloride, hexadecylpyridinium bromide, and boron trifluoride. By the term "strong acid" is meant acids having an ionization constant greater than $1 \times 10^{-3}$.

While any amount of catalyst may be employed, the use of excessive amounts, i. e., above 1%, based on the weight of the alkyl glycoside, frequently results in some degradation of the alkyl glycoside and also in an excessively rapid and even explosive reaction. As low as 0.001% of catalyst may be employed.

Temperatures ranging from room temperature up to 300° C. can be employed successfully for the conversion of alkyl glycosides to water-soluble polymers. In order to avoid the formation of a colored product and to obtain high molecular weight materials, it is preferred to work in the range of 100–225° C. However, the temperature employed depends somewhat on the glycoside which is to be polymerized. In most cases it is preferred to heat the glycoside and catalyst to that temperature at which the glycoside is in a molten condition and at which point there is a continual evolution of alcohol.

The term required for carrying out polymerization of this type ranges from a few minutes to several hours depending on the temperature, catalyst and glycoside employed. The polymerization is carried to completion in shorter time at higher temperature or at the same temperature with increased amount of catalyst. The higher alkylglycosides polymerize more slowly than the lower alkylglycosides, e. g., methylglucoside. Completion of reaction is marked by cessation of alcohol evolution and of viscosity increase. In general 1–3 hours is necessary to obtain polymers having maximum molecular weights.

While it is preferred to carry out this reaction in the absence of a solvent, inert solvents such as dioxane may be used.

By conducting the polymerization of the alkyl glycoside in the presence of a polyhydric alcohol or a polyhydroxythiol, preferably boiling above 190° C., modified polymers are obtained in which the end group comprises the said alcohol or mercaptan radical. Examples of such reagents are ethylene glycol, glycerol, sorbitol, 1-dodecylthiosorbitol, monothioglycerol, 1-thiosorbitol, and the polyethylene glycols. As in the case of methyl glycoside polymers in which the methoxyl end group plays such an important part in imparting improved thermo stability, wider range of solubility properties, and greater resistance to catalyst degradation, these polyfunctional end grouping agents generally tend to accentuate these properties.

Certain agents such as polyalkoxymethyl substituted amides which in themselves are capable of resinification in the presence of acid catalysts can be copolymerized with alkyl glycosides to yield novel types of water soluble copolymers. Compounds of this class include the N,N'-bis(alkoxymethyl)ureas, such as N,N'-bis(methoxymethyl)urea, N,N'-bis(ethoxymethyl)urea, N,N'-bis(isobutoxymethyl)urea; the N,N'-bis(alkoxymethyl)urons, such as N,N'-bis(methoxymethyl)uron, N-N'-bis(ethoxymethyl)uron and N,N'-bis(butoxymethyl)uron; the N,N',N''-tris-(alkoxymethyl)melamines, such as N,N',N''-tris(methoxymethyl)melamine, N,N',N''-tris(propoxymethyl)melamine and N,N',N''-tris(isobutoxymethyl)melamine; and the N,N'-bis(alkoxymethyl) substituted amides of dicarboxylic acids, such as adipic and sebacic acids. The preferred compounds of this class are N,N'-bis(methoxymethyl)adipamide and N,N'-bis(ethoxymethyl)adipamide. Other compounds which are capable of copolymerization with alkyl glycosides are the cyclic acetals such as dioxolane. These cyclic acetals are obtainable from simple aldehydes and glycols. These copolymers are water soluble and range from viscous sirups to hard glassy resinous materials.

The products of the invention, including the copolymers, while soluble in water are substantially insoluble in dioxane. They are characterized, inter alia, in that they have an alkoxy group, preferably of from one to six carbon atoms on the oxocarbonylic or ketaldonyl carbon (aldehyde or ketone carbonyl carbon). Although products having molecular weights corresponding to dimers, trimers and tetramers of the alkyl glycosides are useful those having molecular weights greater than 1000 are more valuable. However, polymers of as low molecular weight as 400 are included in this invention.

The products of this invention are particularly suitable as softeners for regenerated cellulose films, as textile printing assistants, and as non-ionic wetting agents.

The above description and examples are intended to be illustrative only. Any modification of or variation therefrom which conforms to the spirit of the invention is intended to be included within the scope of the claims.

What is claimed is:

1. Process of preparing polymers which comprises heating, under substantially anhydrous conditions, alpha-methylglucoside at a temperature within the range 100–225° C. in the presence of an acidic catalyst, removing the alcohol as it is formed and discontinuing the heating when evolution of alcohol substantially ceases.

2. Process of preparing polymers which comprises heating, under anhydrous conditions a lower alkyl glycoside at a temperature within the range 100–225° C. in the presence of an acidic catalyst, removing the alcohol as it is formed and discontinuing the heating when alcohol evolution substantially ceases.

3. Process of preparing polymers which comprises heating, under anhydrous conditions an alkyl glycoside at a temperature within the range 100–225° C. in the presence of an acidic catalyst, removing the alcohol as it is formed and discontinuing the heating when alcohol evolution substantially ceases.

4. Process of preparing polymers which comprises heating, under anhydrous conditions at a temperature within the range 100–225° C., a composition comprising essentially an alkyl glycoside and an acidic catalyst, removing the alcohol as it is formed and discontinuing the heating when the evolution of alcohol substantially ceases.

5. Process of preparing polymers which comprises heating, under anhydrous conditions at a temperature within the range 100–225° C., a composition comprising essentially a lower alkyl glycoside and an acidic catalyst, removing the alcohol as it is formed and discontinuing the heating when the evolution of alcohol substantially ceases.

6. Process of preparing polymers which comprises heating, under anhydrous conditions at a temperature within the range 100–225° C., a composition comprising essentially alpha-methyl-glycoside and an acidic catalyst, removing the methanol as it is formed and discontinuing the heating when the evolution of methanol substantially ceases.

7. A water soluble high molecular weight condensation polymer of an alkyl glycoside.

8. A water soluble high molecular weight condensation polymer of a lower alkyl glycoside.

9. A water soluble high molecular weight condensation polymer of alpha-methylglucoside.

10. Process of preparing polymers which comprises heating, under anhydrous conditions at a temperature within the range 100–225° C., a composition comprising essentially alpha-methylglycoside and dodecyldimethyl-sulfonium iodide, removing the methanol as it is formed and discontinuing the heating when the evolution of methanol substantially ceases.

RICHARD SEYFARTH SCHREIBER.
JAMES HERBERT WERNTZ.

CERTIFICATE OF CORRECTION.

Patent No. 2,355,245. August 8, 1944.

RICHARD SEYFARTH SCHREIBER, ET AL.

It is hereby certified that error appears in the printed specification of the above numbered patent requiring correction as follows: Page 2, first column, line 14, after the word "cooling" insert a comma; line 44, strike out "ethylene glycol, glycerol, sorbitol, 1-dodecylthio-" and insert instead -- ethylglycosides, butylglycosides, isobutylglyco- --; and second column, line 13, for "term" read --time--; and that the said Letters Patent should be read with this correction therein that the same may conform to the record of the case in the Patent Office.

Signed and sealed this 26th day of September, A. D. 1944.

Leslie Frazer (Seal) Acting Commissioner of Patents.